United States Patent Office 3,223,663
Patented Dec. 14, 1965

3,223,663
NOVEL TEXTILE PRINTING COMPOSITIONS
AND TEXTILE DECORATED THEREWITH
John A. Altobelli, Brooklyn, N.Y., and John De Graff, Waldwick, and Arthur R. Heuser, Mahwah, N.J., assignors to Interchemical Corporation, New York, N.Y., a corporation of Ohio
No Drawing. Filed June 27, 1962, Ser. No. 206,547
10 Claims. (Cl. 260—28.5)

This invention relates to novel textile printing compositions and to the decoration of textiles therewith; more particularly it relates to an aqueous printing paste comprising a unique combination of dispersion agent and binder system, and to textiles decorated therewith.

It is old in the art to decorate textiles with printing compositions containing pigments dispersed in aqueous solutions or dispersions of thermoplastic polymers and a crosslinking agent that will react with the polymer to form a binder that binds the pigment to the textile. Most of the prior art crosslinker systems for decorating textiles employ a polyfunctional alkylenimine compound as the crosslinking agent and a water-soluble acrylic resin such as the salt of a polymer or copolymer of acrylic acid as the thermoplastic polymer that will crosslink with the imine compound.

This invention provides compositions for printing colorants on textiles consisting of coloring matter dispersed in a vehicle comprising a thickened aqueous phase, special elastomeric carboxylated polymer, a reactive dispersant that becomes insoluble when the composition is cured on the textile, and preferably a lubricant. The thickened aqueous phase is adjusted to a substantially neutral pH with volatile alkaline compounds such as ammonia, morpholine, alkylamines, alkanolamines, etc. A pH of 7 to 9 is most practical but a pH of 6 to 10 can be used.

The color can be any organic or inorganic pigment that is commonly used for textile printing, e.g., phthalocyanine blue, phthalocyanine green, azo reds, benzidine yellow, carbon black, and iron oxide.

As reactive dispersing agents we can use the water soluble salts of the partial esters of maleic anhydride copolymers with monoethylenically unsaturated hydrocarbon monomers, especially benzyl alcohol and butyl Cellosolve partial esters. These dispersing agents, when used with the other essential ingredients of our print pastes, give prints having better crock-fastness and better wash fastness than similar print paste in which conventional dispersing agents such as sodium lauryl sulfate, soaps, and non-ionics are used as the dispersing agent. We especially prefer the sodium and ammonium salts of the benzyl esters of ethylene maleic anhydride copolymers. Although we have varied the degree of esterification over wide limits, e.g., 25 to 65%, we especially prefer the half benzyl esters, i.e., the 50% esterified product, of an ethylene maleic anhydride linear copolymer having a specific viscosity of 0.1 in dimethyl formamide at 25° C. The amount of the reactive dispersing agent is preferably within the ratio of 0.25 to 1.0 part for each part of pigment.

The latices that are operable include latices of carboxylated elastomeric, or rubbery copolymers. Elastomeric polymer and copolymer latices are well known anti-crock materials in the art of textile printing with pigments, e.g., see U.S. Patent No. 2,691,005. In general any of these elastomer latices that contain about 1–5% of carboxyl-containing monomer copolymerized with one or more other monomers can be used in our print pastes. For optimum results we especially prefer to use latices of (1) carboxylated acrylic or methacrylic ester elastomeric polymers, (2) carboxylated butadiene-acrylonitrile elastomeric polymers, (3) carboxylated butadiene-acrylic ester elastomer polymers, and (4) carboxylated butadiene-styrene elastomeric polymers. In each case the carboxyl-containing monomer may be acrylic acid, methacrylic acid, itaconic acid, etc.

Thickeners for water are well known materials in the textile printing art and in general we can use any of these thickeners that are "reactive" when heated. By reactive we mean that the thickener insolubilizes when the print paste is cured on the textile.

Example 1

A concentrate color composition containing:

| | |
|---|---:|
| Phthalocyanine blue pigment | 16.00 |
| Reactive dispersing agent (ammonium salt of half benzyl ester of ethylenemaleic anhydride copolymer having a specific viscosity of 0.1 in dimethyl formamide) | 4.80 |
| Ammonium hydroxide (28%) | 2.50 |
| Glycerol (humectant) | 1.00 |
| Reactive thickener (Acrysol ASE–60) | 8.58 |
| Varsol | 3.70 |
| Resimene 882 (butylated melamine formaldehyde resin 66% solids on xylol) | 3.70 |
| Reactive latex (40% solid, of copolymer of 78 parts 2-ethylhexyl acrylate, 20 parts acrylonitrile and 2 parts itaconic acid) on dry basis | 5.35 |
| Water to make 100%. | | is made by first slurrying an aqueous presscake of the pigment, containing about 30% pigment, with a 30% aqueous solution of the dispersing agent and enough water to make 100 parts of slurry. The slurry is stirred until uniform and then blended thoroughly with a mixture of the ammonium hydroxide and glycerol before adding the reactive thickener, melamine resin, reactive latex, and water in the order given, mixing thoroughly after each addition. The resulting composition can be printed on textiles to give prints having excellent fastness properties. However, in most instances it is necessary to cut this concentrate with a clear printing vehicle to produce the desired depth of shade. For this purpose any conventional aqueous or oil-in-water emulsion type clear vehicle may be used. The all aqueous printing vehicle of Example 1 of British Patent No. 781,498 is a suitable extender vehicle. A preferred oil-in-water emulsion type clear would consist of 2.5 parts of a concentrate containing 36% Solvesso 100, 1% Thixin, 25% styrenated alkyd (Cycopol S101–1), 12.4% sodium lauryl sulfate, 0.4 morpholine, 24.6% Monsanto DX840–71 thickener and 25.2% water, diluted with 40 parts Varsol and enough water to make 100 parts. The pH is adjusted to 7 to 8 with 28% ammonia. When extra low crock is desired part of the water in the clear can be replaced with latex, preferably a reactive latex as used in the color if extremely good fastness is desired. Also, to obtain optimum dry crock properties in the final prints it is desirable to include a lubricant as hereinabove described and as shown in many of the subsequent examples.

*Example 2*

In a manner similar to that of Example 1 a concentrate color composition was prepared containing:

| | |
|---|---:|
| Phthalocyanine blue pigment | 16.00 |
| Reactive dispersing agent, as in Example 1 | 4.80 |
| Ammonium hydroxide (28%) | 2.50 |
| Glycerol | 1.00 |
| Reactive thickener (Acrysol ASE-60) | 8.58 |
| Varsol | 3.70 |
| Resimene 882 | 3.70 |
| Reactive latex (40% solid, copolymer of 52.5 parts butadiene, 42.5 acrylonitrile and 5 parts methacrylic acid) on dry basis | 5.35 |
| Water to make 100%. | |

This concentrate is cut to any desired color concentration with clear printing vehicles described in Example 1 to give print pastes which, when printed on textiles and cured at conventional temperatures, give prints having excellent crock fastness. Chemically, these reactive thickeners will comprise linear natural and synthetic polymers or partially cross-linked linear polymers that contain reactive groups, especially carboxyl groups, amide groups, or alkylolated amide groups, such as methylol amide groups. The thickener will be used in the amount necessary to thicken the print paste to printing consistency.

For optimum dry crock properties the print paste should contain a special additive which, for lack of a better term, we can characterize as a lubricant. Suitable dry crock additives, when used in the amount of up to about 5%, include water-insoluble polysiloxane materials, paraffin waxes especially microcrystalline wax, and lubricating oils. The polysiloxane materials are especially effective under varying conditions of humidity, temperature, and other stresses.

Other conventional additives can be included in the print pastes if desired. For example humectants, water-soluble thermosetting resins and water-insoluble resins.

When it is desired to dilute, or cut, the pigmented paste to lower color concentration we may do this with conventional clear, or unpigmented, printing vehicle. However, for optimum fastness properties we prefer to use clear printing vehicles containing reactive thickeners similar to those used in the color composition. Additional latex low-crock agent can also be included in the clear when extra low-crock protection is desired.

*Example 3*

A concentrate color composition containing:

| | |
|---|---:|
| Phthalocyanine blue pigment | 16.0 |
| Reactive dispersing agent (ammonium salt of half benzyl ester of ethylenemaleic anhydride copolymer having specific viscosity of 0.1 to dimethyl formamide) | 4.0 |
| Ammonium hydroxide (28% ammonia) | 2.0 |
| Humectant (glycerol) | 1.0 |
| Water | 50.5 |
| Reactive thickener (Acrysol ASE-60) | 2.0 |
| Melamine-formaldehyde resin (Rhonite 401) | 3.5 |
| Lubricant (DC 22 Silicone resin) | 5.0 |
| Latex of reactive elastomer (butadienemethyl methacrylate copolymer type) | 16.0 | is made by first slurrying an aqueous presscake of the pigment, containing about 30% pigment, with a 30% aqueous solution of the dispersing agent and enough water to make 100 parts of slurry. The slurry is stirred until uniform and then blended thoroughly with a mixture of the ammonium hydroxide and glycerol before adding the reactive thickener, melamine formaldehyde resin, lubricant, latex, and water in the order given, mixing thoroughly after each addition. The resulting composition can be printed on textiles to give prints having excellent fastness properties. However, in most instances it is necessary to cut this concentrate with a clear printing vehicle to produce the desired depth of shade. For this purpose any conventional aqueous or oil-in-water emulsion type clear vehicle may be used. The all-aqueous printing vehicle of Example 1 of British Patent No. 781,498 is a suitable extender. A preferred oil-in-water emulsion type clear would consist of 2.5 parts of a concentrate containing 36% Solvesso 100, 1% Thixin, 25% styrenated alkyl (Cycopol S101-1), 12.4% sodium lauryl sulfate, 0.4 morpholine, 24.6% Monsanto DX840-71 thickener and 25.2% water, diluted with 40 parts Varsol and enough water to make 100 parts. The pH is adjusted to 7 to 8 with 28% ammonia. When extra low crock is desired part of the water in the clear can be replaced with latex, preferably a reactive latex as used in the color if extremely good fastness is desired.

*Example 4*

In a manner similar to that of Example 3 a concentrate color composition was prepared containing:

| | |
|---|---:|
| Phthalocyanine green pigment | 16.60 |
| Reactive dispersing agent, as in Ex. 1 | 4.15 |
| Tamol N (40% aqueous solution of the condensate of naphthalene sulfonic acid and formaldehyde) | 1.65 |
| Ammonia (28%) | 3.00 |
| Thickener, as in Ex. 1 | 4.00 |
| Lubricant, as in Ex. 3 | 5.00 |
| Latex of reactive elastomer, as in Ex. 3 | 15.00 |
| Varsol | 4.00 |
| Water | 46.60 |

This example illustrates the use of a small amount of conventional dispersing agent in addition to the reactive dispersing agent. This concentrate can be cut to any desired color concentration with the clear printing vehicles described in Example 1 to give print pastes which, when printed on textiles and cured at conventional temperatures, give prints having excellent crock fastness.

*Example 5*

A color concentrate was similarly prepared containing,

| | |
|---|---:|
| Red azo pigment (e.g., made by coupling the 2,5-dimethoxy-5-chloro anilide of $\beta$-oxynaphthoic acid with diazotized 2-methoxy-5-sulfondiethylaniline) | 11.50 |
| Reactive dispersing agent, as in Example 1 | 9.30 |
| Tamol N (same as in Example 4) | 1.15 |
| Ammonia (28%) | 1.80 |
| Thickener (same as in Example 1) | 3.70 |
| Lubricant (same as in Example 3) | 5.00 |
| Latex of reactive elastomer (same as in Example 3) | 11.15 |
| Varsol | 8.75 |
| Water | 47.65 |

This and the subsequent examples of color concentrate have properties similar to the foregoing examples and can be treated in the same way.

*Example 6*

This and the subsequent examples of color concentrates were prepared in a manner similar to those of the foregoing examples. The components were:

| | |
|---|---:|
| Violet Azo pigment made by coupling the p-phenetidide of $\beta$-oxynaphthoic acid with diazotized 2-methoxy 4-benzoylamino aniline | 6.45 |
| Reactive dispersing agent, (sodium salt of half benzyl ester of ethylene-maleic anhydride) used in Example 1 | 3.85 |
| Sodium oleate | 1.35 |
| Ammonia (28%) | 2.00 |
| Thickener (as in Example 1) | 5.00 |
| Lubricant (as in Example 1) | 5.00 |
| Latex of reactive elastomer (as in Example 3) | 6.70 |
| Water to make 100%. | |

Example 7

The constituents were,

| | |
|---|---:|
| Red Azo pigment (made by coupling Naphthol AS–KB with diazotized amino anisic acid anilide) | 12.60 |
| Reactive dispersing agent, as in Example 1 | 10.50 |
| Tamol N, as in Example 4 | 1.26 |
| Ammonia (28%) | 1.90 |
| Thickener as in Example 1 | 3.80 |
| Humectant (ethylene glycol) | 1.00 |
| Lubricant, as in Example 1 | 4.80 |
| Melamine-formaldehyde resin, as in Example 3 | 4.80 |
| Latex of reactive elastomer, as in Example 3 | 13.40 |
| Varsol | 4.30 |
| Water to make 100%. | |

Example 8

The constituents were,

| | |
|---|---:|
| Benzidine yellow | 12.55 |
| Reactive dispersing agent, as in Example 6 | 7.18 |
| Soap flakes | 2.51 |
| Ammonia (28%) | 1.00 |
| Thickener, as in Example 1 | 2.30 |
| Lubricant, as in Example 3 | 5.00 |
| Latex of reactive elastomer, as in Example 3 | 12.55 |
| Xylol | 1.00 |
| Water to make 100%. | |

Example 9

The constituents were,

| | |
|---|---:|
| Copper chelate of an azo brown (made by coupling of $\beta$-oxynaphthoic acid with diazotized p-nitro aniline) | 15.00 |
| Reactive dispersing agent, as in Example 6 | 15.00 |
| Thickener, as in Example 1 | 2.00 |
| Lubricant, as in Example 3 | 4.00 |
| Melamine-formaldehyde resin (Resimene 882) | 2.50 |
| Latex of reactive elastomer, 41% solids, carboxylated styrene-butadiene copolymer | 15.00 |
| Varsol | 2.50 |

Example 10

The constituents were,

| | |
|---|---:|
| Mapico Lemon yellow (iron oxide yellow) | 39.00 |
| Reactive dispersing agent, as in Example 1 | 10.80 |
| Ammonia (28%) | 0.54 |
| Thickener, as in Example 1 | 2.16 |
| Latex of reactive elastomer, carboxylated styrene-butadiene copolymer | 19.40 |
| Water to make 100%. | |

Example 11

The constituents were,

| | |
|---|---:|
| Red azo pigment, same as in Example 5 | 12.60 |
| Ammonia (28%) | 1.90 |
| Thickener, as in Example 1 | 3.80 |
| Microcrystalline wax emulsion (16%) | 10.00 |
| Latex of reactive elastomer, 41% solids carboxylated styrene-butadiene copolymer | 15.00 |
| Varsol | 5.00 |
| Water to make 100%. | |

Example 12

The constituents were,

| | |
|---|---:|
| Carbon black pigment | 11.10 |
| Reactive dispersing agent, as in Example 1 | 2.80 |
| Glycerol | 2.80 |
| Ammonia (28%) | 0.90 |
| Casein solution (16.2% ammonium caseinate in water) | 9.30 |
| Water soluble thermosetting resin (31% aqueous solution of methylolated acrylamide copolymer) | 18.50 |
| Latex of reactive elastomer, as in Example 1 | 18.50 |
| Lubricant (DC36 Silicone oil emulsion) | 9.30 |
| Water to make 100%. | |

The water soluble thermosetting resin of this example was made as follows: 125 parts of isopropanol were heated to reflux and then over a period of 1 hour was added a mixture of 28.2 parts acrylamide, 130 parts ethyl acrylate 20.0 parts lauryl acrylate 10 parts methacrylic acid, 75 parts isopropanol, 1.5 parts benzoyl peroxide and 0.8 part of tertiary dodecyl mercaptan. Refluxing was continued for 2 hours, another 1.5 parts benzoyl peroxide added and refluxing continued another hour. The solution was cooled to room temperature and the isopropanol removed by vacuum distillation, at 4–5 mm. of Hg at room temperature. A solution of 64 parts of 37% Formalin in 300 parts of water and 41 parts of 29% aqueous ammonia was added to the resin and the mixture brought slowly up to 70° C. It was heated four hours more at 70–72° C. The solids content was about 31%.

Example 13

The constituents were,

| | |
|---|---:|
| Carbon black pigment | 16.80 |
| Reactive dispersing agent, as in Example 1 | 4.20 |
| Ammonia (28%) | 1.00 |
| Thickener, as in Example 1 | 2.00 |
| "Poly-em" emulsion, 40% solids (polyethylene emulsion) | 7.00 |
| Latex of reactive elastomer, 41% solids, carboxylated styrene-butadiene copolymer | 30.00 |
| Water to make 100%. | |

Example 14

The constituents were,

| | |
|---|---:|
| Carbon black pigment | 14.00 |
| Reactive dispersing agent, as in Example 1 | 3.50 |
| Ammonia (28%) | 1.00 |
| Thickener, as in Example 1 | 2.00 |
| Lubricant, as in Example 3 | 7.00 |
| Water soluble thermosetting resin of Ex. 12 | 10.00 |
| Latex of reactive elastomer as in Example 3 | 20.00 |
| Mineral oil | 10.00 |
| Water to make 100%. | |

The half benzyl ester of ethylene maleic anhydride was made by heating 108 g. of benzyl alcohol and 126 g. of "DX–840–11" (equimolecular quantities) to 190° C. by raising the temperature at the rate of 15–20° C. every ten minutes. Heating at 190° C. was continued 15 minutes and then the temperature was raised to 205° C. and maintained there for 15 minutes. The small amount of residual volatiles was then distilled off. "DX–840–11" is an ethylene/maleic anhydride linear copolymer having a specific viscosity of 0.1 in a 1% solution in dimethyl formamide at 25° C.

The silicone can be, for example, an emulsion of a silicone rubber polymer containing about 48% water, the silicone being a mixture of polymeric dimethylsiloxanes and polymeric methyl hydrogen-siloxanes.

Example 15

The constituents were:

| | Percent by weight |
|---|---:|
| Phthalocyanine blue pigment | 16.65 |
| Reactive dispersing agent (half butyl Cellosolve ester of styrene-maleic anhydride copolymer) | 4.17 |
| Ammonia (28%) | 3.00 |
| Acrysol ASE–60 | 4.00 |
| Latex of reactive elastomer (as in Example 3) | 15.00 |
| Water to make 100%. | |

Example 16

The constituents were the same as in Example 15 except that the reactive dispersing agent was 37.5% butyl Cellosolve ester of styrene maleic anhydride copolymer.

Example 17

The constituents were the same as in Example 15 except that the reactive dispersing agent was the 25% butyl Cellosolve ester of styrene maleic anhydride copolymer.

Example 18

The constituents were the same as in Example 15 except that the reactive dispersing agent was the 62.5% butyl Cellosolve ester of styrene-maleic anhydride copolymer.

Example 19

The constituents were the same as in Example 15 except that the half benzyl ester of styrene-maleic anhydride copolymer was used as reactive dispersing agent.

Varsol is a petroleum hydrocarbon solvent having a boiling range of 304–394° F. and a kauri-butanol value of 33–45.

Solevesso 100 is a petroleum hydrocarbon having a boiling range of 320–360° F. and a kauri-butanol value of about 93.

Cycopol S–101–1 is an alkyd 25% styrenated and is used as a 50% solution in petroleum spirits.

Monsato DX–840–71 is a partially crosslinked ethylene-maleic anhydride copolymer having a viscosity of 40,000 c.p.s. in a 1% dimethyl formamide solution when measured in a Brookfield Viscometer at 5 r.p.m. with a No. 6 spindle and at 25° C.

Rhondite 401 is a melamine-formaldehyde resin.

Acrysol ASE–60 is an aqueous emulsion of low viscosity capable of producing great thickening action when made alkaline. The copolymer dispersed in the emulsion is a carboxylic acid-containing cross-linked acrylic ester. The emulsion contains 28% solids, the colloidal charge is anionic, the pH as supplied is 3.5. The viscosity as supplied is 4.0 c.p.s. but the solution viscosity of 5% sodium salt is 25,000 c.p.s., the 1% sodium salt being 3,000 c.p.s. Viscosities are Brookfield values, 12 r.p.m. at 25° C. In stoichiometric calculations the solids have an effective equivalent weight of 218.

What is claimed is:

1. A reactive textile printing composition consisting of pigment dispersed in a vehicle comprising (a) a thickened aqueous phase, the thickener which contains reactive groups, insolubilizes when the printing composition is cured by heat, (b) a carboxylated elastomeric polymer including from 1 to 5% of an acid selected from the group consisting of acrylic, methacrylic and itatonic acids, (c) a reactive dispersing agent consisting of water-soluble salts of partial esters of the copolymer of the group consisting of copolymers of maleic anhydride with ethylene, and copolymers of maleic anhydride with styrene, the esterifying substances being selected from the group consisting of benzyl alcohol and butyl Cellosolve, the degree of partial esterification being from 25 to 65% and the amount of said dispersing agent being from 0.25 to 1 part for each part of pigment and (d) 0 to 5% of a lubricant selected from the group consisting of lubricating oil, paraffin wax, and mixtures of polydimethylsiloxanes with polymethylhydrogen-siloxanes.

2. A reactive textile printing composition according to claim 1 wherein (a) the thickened aqueous phase has been brought to a pH of 7–9 with a volatile alkaline substance.

3. A reactive textile printing composition consisting of pigment dispersed in a vehicle comprising (a) a thickened aqueous phase, the thickener which contains reactive groups, insolubilizes when the printing composition is cured by heat, (b) a carboxylated elastomeric polymer including from 1 to 5% of an acid selected from the group consisting of acrylic, methacrylic and itaconic acids, (c) a reactive dispersing agent consisting of water-soluble salts of partial esters of the copolymer of maleic anhydride with ethylene, the esterifying substances being selected from the group consisting of benzyl alcohol and butyl Cellosolve, the degree of partial esterification from 25 to 65% and the amount of said dispersing agent being from 0.25 to 1 part for each part of pigment and (d) 0 to 5% of a lubricant selected from the group consisting of lubricating oil, paraffin wax, and mixtures of polydimethylsiloxanes with polymethylhydrogen-siloxanes.

4. A reactive textile printing composition according to claim 3 wherein (a) the thickened aqueous phase has been brought to a pH of 7–9 with a volatile alkaline substance.

5. A reactive textile printing composition consisting of pigment dispersed in a vehicle comprising (a) a thickened aqueous phase, the thickener which contains reactive groups, insolubilizes when the printing composition is cured by heat, (b) a carboxylated elastomeric polymer including from 1 to 5% of an acid selected from the group consisting of acrylic, methacrylic and itatonic acids, (c) a reactive dispersing agent consisting of water-soluble salts of the half benzyl ester of the copolymer of maleic anhydride with ethylene, the amount of said dispersing agent being from 0.25 to 1 part for each part of pigment, and (d) 0 to 5% of a lubricant selected from the group consisting of lubricating oil, paraffin wax, and mixtures of polydimethylsiloxanes with polymethylhydrogen-siloxanes.

6. A reactive textile printing composition consisting of pigment dispersed in a vehicle comprising (a) a thickened aqueous phase, the thickener which contains reactive groups, insolubilizes when the printing composition is cured by heat, (b) a carboxylated elastomeric terpolymer of butadiene, methyl methacrylate and 1 to 5% of a copolymerizable carboxylic acid selected from the group consisting of acrylic, methacrylic and itaconic acids, (c) a reactive dispersing agent consisting of the water soluble salts of the half benzyl ester of the copolymer of maleic anhydride with ethylene, and the amount of acid dispersing agent being from 0.25 to 1 part for each part of pigment and (d) 0 to 5% of a lubricant selected from the group consisting of lubricating oil, paraffin wax and mixtures of polydimethylsiloxanes with polymethylhydrogen-siloxanes.

7. A reactive textile printing composition consisting of pigment dispersed in a vehicle comprising (a) a thickened aqueous phase, the thickener which contains reactive groups, insolubilizes when the printing composition is cured by heat, (b) a latex of a copolymer of 52.5 parts butadiene, 42.5 parts acrylonitrile and 5 parts methacrylic acid and (c) a reactive dispersing agent consisting of the water soluble salts of the half benzyl ester of the copolymer of maleic anhydride with ethylene, the amount of acid dispersing agent being from 0.25 to 1 part for each part of pigment.

8. A reactive textile printing composition as is claimed in claim 7 and containing microcrystalline wax in an amount not exceeding 5% by weight.

9. A reactive textile printing composition consisting of pigment dispersed in a vehicle comprising (a) a reactive thickener which insolubilizes when the printing composition is cured by heat, (b) a latex of a copolymer of 78 parts of 2-ethylhexyl acrylate, 20 parts acrylonitrile and 2 parts itaconic acid and (c) a reactive dispersing agent consisting of water-soluble salt of the half benzyl ester of maleic anhydride with ethylene, the amount of said dispersing agent being from 0.25 to 1 part for each part of pigment.

10. A reactive textile printing composition as claimed in claim 9 and containing microcrystalline wax in an amount not exceeding 5% by weight.

References Cited by the Examiner

UNITED STATES PATENTS

| | | | |
|---|---|---|---|
| 2,612,480 | 9/1952 | May | 260—28.5 |
| 2,647,094 | 7/1953 | Hahn | 260—29.6 |
| 2,691,005 | 10/1954 | Booth | 260—22 |

OTHER REFERENCES

Warth, The Chemistry and Technology of Waxes, Reinhold Publishing Corp., New York, page 754.

MORRIS LIEBMAN, *Primary Examiner.*